US011968509B2

(12) United States Patent
Wen et al.

(10) Patent No.: US 11,968,509 B2
(45) Date of Patent: Apr. 23, 2024

(54) SPEAKER

(71) Applicant: HARMAN INTERNATIONAL INDUSTRIES, INCORPORATED, Stamford, CT (US)

(72) Inventors: Hong Wen, Shenzhen (CN); Jihui Zeng, Shenzhen (CN); Yuanzhen Niu, Shenzhen (CN); Zhenjin Zhu, Shenzhen (CN)

(73) Assignee: Harman International Industries, Incorporated, Stamford, CT (US)

( * ) Notice: Subject to any disclaimer, the term of this patent is extended or adjusted under 35 U.S.C. 154(b) by 312 days.

(21) Appl. No.: 17/299,825

(22) PCT Filed: Dec. 6, 2019

(86) PCT No.: PCT/CN2019/123697
§ 371 (c)(1),
(2) Date: Jun. 4, 2021

(87) PCT Pub. No.: WO2020/114493
PCT Pub. Date: Jun. 11, 2020

(65) Prior Publication Data
US 2021/0377666 A1 Dec. 2, 2021

(30) Foreign Application Priority Data
Dec. 7, 2018 (CN) ......................... 201811493035.8
Dec. 7, 2018 (CN) ......................... 201822049115.6

(51) Int. Cl.
*H04R 9/06* (2006.01)
*H04R 7/20* (2006.01)
*H04R 9/04* (2006.01)

(52) U.S. Cl.
CPC ............... *H04R 7/20* (2013.01); *H04R 9/046* (2013.01); *H04R 9/06* (2013.01); *H04R 2307/201* (2013.01); *H04R 2307/207* (2013.01)

(58) Field of Classification Search
CPC ............ H04R 1/025; H04R 7/18; H04R 7/20; H04R 9/046; H04R 31/006; H04R 9/06;
(Continued)

(56) References Cited

U.S. PATENT DOCUMENTS 6,751,332 B2 * 6/2004 Kobayashi .............. H04M 1/03 381/189
7,031,487 B2 * 4/2006 Stiles ..................... H04R 1/025 381/423
(Continued)

FOREIGN PATENT DOCUMENTS

CN 204518057 U 7/2015
CN 208112929 U 11/2018
EP 1538869 A1 6/2005

*Primary Examiner* — Huyen D Le
(74) *Attorney, Agent, or Firm* — Angela M. Brunetti

(57) ABSTRACT

A speaker having a support structure having a bracket, and a vibration structure having a bend ring. The bend ring comprises an arc portion and an outer brim connected to the bracket. The outer brim of the bend ring extends downwardly to abut and connect to an outer brim of the top of the bracket, and the outer brim of the bend ring does not exceed the outermost end of the arc portion in the radial direction. The effective vibration area of a speaker is increased by using the above structure, so that the sensitivity of the speaker is improved.

13 Claims, 4 Drawing Sheets

(58) Field of Classification Search
CPC ........ H04R 2307/201; H04R 2307/204; H04R 2307/207
See application file for complete search history.

(56) References Cited

U.S. PATENT DOCUMENTS

| | | | | |
|---|---|---|---|---|
| 7,548,631 | B2 * | 6/2009 | Espiritu | H04R 7/16<br>381/386 |
| 2013/0287245 | A1 * | 10/2013 | Chen | H04R 9/02<br>381/398 |
| 2020/0145760 | A1 * | 5/2020 | Kikuchi | H04R 7/20 |

* cited by examiner

SPEAKER

TECHNICAL FIELD

The disclosure relates to a speaker, more particularly, to a speaker with an improved bend ring structure.

BACKGROUND ART

At present, with the increasing popularity of traditional sound boxes and smart sound boxes in the market, consumers are increasingly demanding sound quality. A speaker is a core component in a sound box, and its specific design requirements may include one or more of the following aspects: (1) a speaker can withstand high power; (2) a speaker has a lower resonant frequency; (3) a speaker has a very high sensitivity; (4) the size of a speaker is as small as possible; and (5) a speaker has low distortion.

The effective vibration area of a speaker is an important factor affecting the sensitivity of the speaker. On the one hand, the market needs a lighter, thinner and smaller speaker, and on the other hand, a smaller volume of a speaker may reduce the effective vibration area, so that a decrease in the sensitivity of a speaker may be caused.

Therefore, it is desirable to provide a speaker that has as large an effective vibration area as possible under a certain outer diameter limit.

SUMMARY OF THE INVENTION

The present disclosure provides a speaker having as large an effective vibration area as possible.

According to the embodiments of the present disclosure, provided is a speaker comprising: a support structure, wherein the support structure comprises a bracket; and a vibration structure, wherein the vibration structure comprises a bend ring, the bend ring comprises an arc portion and an outer brim connected to the bracket, the outer brim of the bend ring extends downwardly to abut and connect to an outer brim of the top of the bracket, and the outer brim of the bend ring does not exceed the outermost end of the arc portion in the radial direction.

Optionally, the outer brim of the bend ring extends vertically downward, and the outer brim of the top of the bracket has a mating surface therewith. Optionally, the lower edge of the outer brim of the bend ring does not exceed the lower edge of the outer brim of the top of the bracket, and the bracket comprises a horizontal edge that extends radially outward along the lower edge of the outer brim of the top.

Optionally, the arc portion of the bend ring is symmetrical with respect to an axis extending from the highest point of the arc portion along the vertical direction of the speaker.

Optionally, the arc portion of the bend ring is asymmetrical with respect to an axis extending from the highest point of the arc portion along the vertical direction of the speaker, and the highest point is offset radially outward or radially inward relative to the midpoint of the width of the arc portion.

Optionally, the highest points of the bend ring form a waved shape in the horizontal direction of the speaker.

Optionally, the outer brim of the bend ring is connected to the bracket by bonding or snapping.

Optionally, the vibration structure further comprises a damper, and an outer brim of the damper is connected to the bracket in a vertical direction.

Optionally, the bend ring is made of one or more of rubber, polyurethane, and foam.

Optionally, the speaker is a speaker with an axisymmetric structure or a speaker with a non-axisymmetric structure. Optionally, the speaker may be a racetrack type speaker or a square speaker.

Optionally, the speaker comprises a magnetic circuit system, and the magnetic circuit system comprises a magnetic gap; and the vibration structure further comprises a damper and a voice coil which can be suspended in the magnetic gap, connected to the damper.

Optionally, the speaker may be a passive radiator.

DETAILED DESCRIPTION OF EMBODIMENTS

Figure 1:
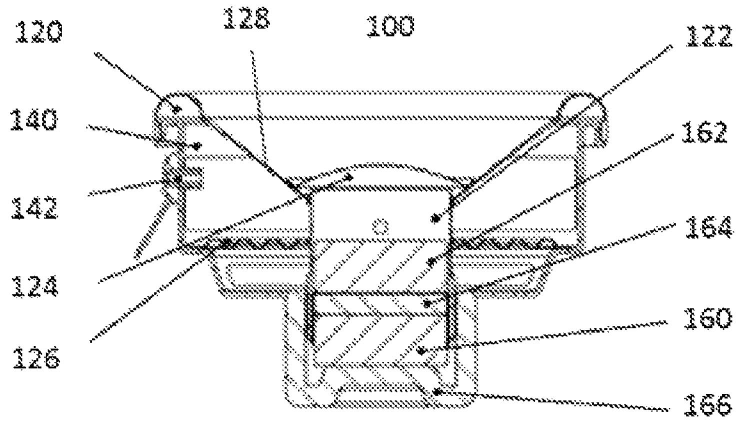
FIG. 1 illustrates a cross-sectional view of a speaker in accordance with an embodiment of the present disclosure.

Embodiments of the present disclosure are described in detail below, and examples of the embodiments are illustrated in the drawings. In the drawings, the same or similar reference numerals indicate the same or similar elements or elements having the same or similar functions.

The embodiments described below with reference to the drawings are illustrative, only for explaining the present disclosure, and are not to be construed as limiting the present disclosure.

Unless otherwise defined, technical terms or scientific terms used herein shall be taken to mean the ordinary meanings for a person skilled in the art to which the present disclosure pertains. In the description of the present disclosure, it is to be understood that an orientation or positional relationship indicated by the terms “center”, “longitudinal”, “lateral”, “upper”, “lower”, “front”, “back”, “left”, “right”, “vertical”, “horizontal”, “top”, “bottom”, “inside”, “outside”, etc. is an orientation or positional relationship shown in the drawings. This is only for the convenience of describing the present disclosure and the simplification of the description, and does not indicate or imply that the device or element referred to must have a particular orientation or be constructed and operated in a particular orientation, and therefore, it should not be construed as limiting the present disclosure.

Figure 2:
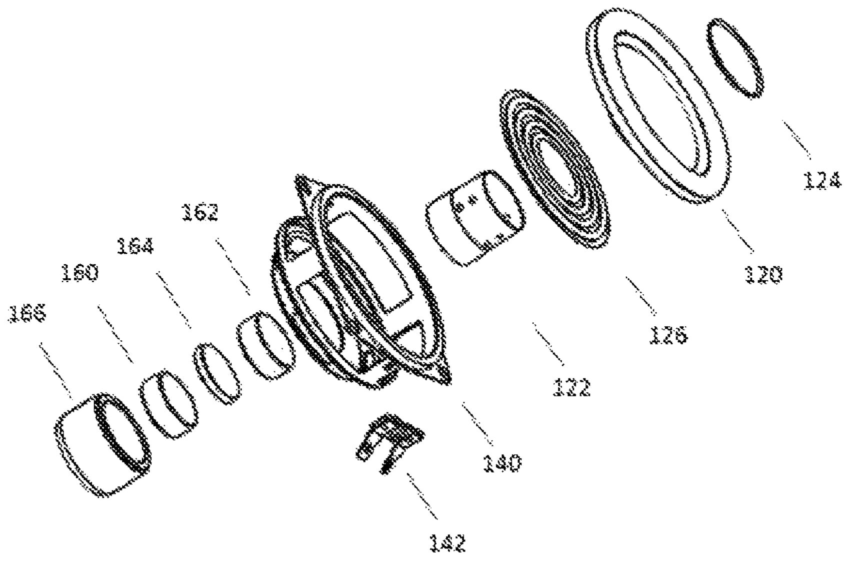
FIG. 2 is an exploded view of the speaker shown in FIG. 1.

FIGS. 1-2 illustrate a speaker 100 in accordance with an embodiment of the present disclosure, wherein FIG. 1 is a cross-sectional view, and FIG. 2 is an exploded view. FIG.

Figure 3A:
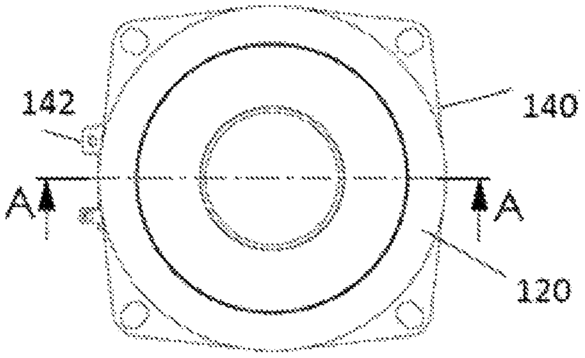
FIG. 3A illustrates a top view of a speaker in accordance with an embodiment of the present disclosure.
Figure 3B:
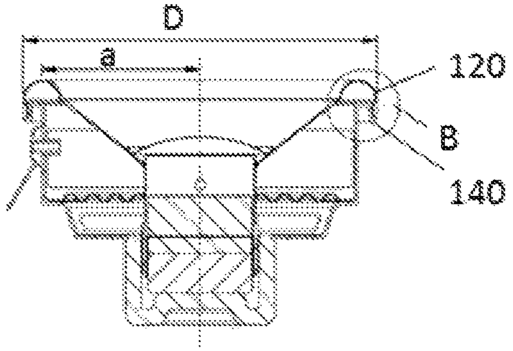
FIG. 3B is a cross-sectional view, taken along the section A-A, of the speaker shown in FIG. 3A.

3A illustrates a top view of a speaker in accordance with an embodiment of the present disclosure; FIG. 3B is a cross-sectional view, taken along the section A-A, of the speaker shown in FIG. 3A; and FIG. 3C is an enlarged view of a connection part of the bend ring and the bracket in FIG. 3B.

The speaker 100 comprises a vibration structure, a magnetic circuit system and a support structure. The vibration structure may comprise a bend ring 120, a voice coil 122, a dustproof cover 124, a damper 126 and a diaphragm 128. The magnetic circuit system may comprise a main magnet 160, a sub-magnet 162, an upper pole piece 164 and a lower pole piece 166. The support structure may comprise a bracket 140. The bracket 140 is used for accommodating the vibration structure and the magnetic circuit system. The speaker of the present disclosure is not limited thereto, and may have more or less components.

In the vibration structure, the radial outer brim of the bend ring 120 is connected to the bracket 140, and its radial inner brim is connected to the diaphragm 128. The radial outer brim of the damper 126 is connected to the bracket 140, and its radial inner brim is connected to the voice coil 122. When an electrical signal (a sound signal) enters the voice coil, the voice coil can vibrate, in a magnetic gap, along the axis of the speaker, and the vibration of the voice coil will drive the vibration of the diaphragm. The connection between the bend ring 120 and the bracket 140 will be described in more detail below.

Figure 3C:
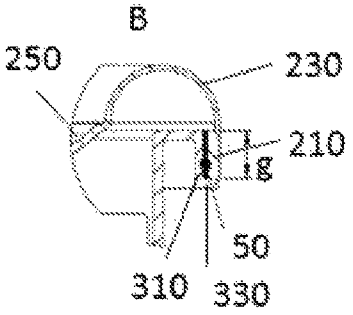
FIG. 3C is an enlarged view of a connection part of the bend ring and the bracket in FIG. 3B.

As shown in FIG. 1, FIG. 3B and FIG. 3C, the bend ring 120 comprises an outer brim 210, an arc portion 230 and an inner brim 250. The outer brim 210 of the bend ring 120 is located at the outermost side of the bend ring 120 in a radial direction and extends downward (the "upper" and "lower" here are determined relative to the placement direction of the speaker in the Figure, i.e. the bend ring and the diaphragm of the speaker are located at the upper part of the speaker, and the magnetic circuit system of the speaker is located at the lower part of the speaker) to abut an outer brim 310 of the top of the bracket. FIG. 1, FIG. 3B and FIG. 3C only show the case where the outer brim 210 of the bend ring extends downward in a vertical direction.

However, the outer brim 210 of the bend ring 120 is not limited to having the structure of extending downward in the vertical direction of the speaker (i.e. the axial direction of the speaker) and may also have a structure of obliquely extending downward. However, the outer brim 210 of the bend ring does not exceed the outermost end of the arc portion 230 of the bend ring 120 in the radial direction, for example, the outer brim 210 of the bend ring is inclined inward with respect to the outermost end of the arc portion 230 of the bend ring 120 in the radial direction.

The outer brim 210 of the bend ring 120 extending downward may be formed into a structure of vertically downward or obliquely downward during manufacture.

In order to be connected to the outer brim 210 of the bend ring 120, the outer brim 310 of the top of the bracket 140 may be formed by matching the radially downwardly extending angle of the outer brim 210 of the bend ring 120, in order to maintain the abutting of the outer brim 210 of the bend ring 120 and the outer brim 310 of the bracket 140. For example, where the outer brim 210 of the bend ring 120 is in a substantially vertical downward orientation, the outer brim 310 of the bracket is also correspondingly formed to be substantially vertical; and where the outer brim 210 of the bend ring 120 is in an obliquely downward orientation, the outer brim 310 of the bracket is also formed to be inclined downwardly at substantially the same angle.

The outer brim 210 of the bend ring 120 and the outer brim 310 of the bracket 140 may be fixed together by bonding. An adhesive 50 is located between opposite parts of the two. In order to ensure the strength of the bond between the two, the opposite parts of the outer brim 210 of the bend ring 120 and the outer brim 310 of the bracket should be large enough. The length of the outer brim 210 of the bend ring 120 may be chosen according to the size of a speaker. The bend ring and the bracket 140 may also be connected by other means, for example, connected by snapping. In addition, in order to enhance the strength of connection, the thickness of the outer brim 210 of the bend ring may be greater than the thickness of other parts of the bend ring.

The bend ring may be made of various suitable materials as needed, including but not limited to rubber, polyurethane (PU), foam, cloth-based materials, paper-based materials, etc.

The above connection means of a bend ring and a bracket may also be applied to the connection of a damper and a bracket. For example, an outer brim of a damper extends vertically downward or upward or obliquely downward or upward and is connected to the corresponding part of the bracket by bonding, etc.

The top of the bracket 140 may further comprise a radial edge 330 extending outward in a radial direction along the lower edge of the outer brim 310 of the top of the bracket (as shown in FIG. 3C). The length of the outer brim 210 of the bend ring 120 does not exceed the lower edge of the outer brim 310 of the bracket, so that the radial edge 330 may radially extend below the lower edge of the outer brim 210 of the bend ring 120. The radial edge 330 of the bracket 140 may also be used for arranging an aperture for fixing the speaker (as shown in FIG. 3A). In order to minimize the size of the speaker, the maximum width of the bracket may be limited to be not exceeding the diameter D of the bend ring. Optionally, the support structure may also comprise a terminal 142, which is arranged on the side of the bracket 140 and is located inside the radial outer brim of the bend ring in a radial direction. The terminal 142 is connected to a lead wire of the voice coil for an electrical connection between the voice coil and the outside of the speaker.

The bracket in the present disclosure is not limited to having the structure shown in the drawings, and the bracket may also be a case or have other structures that are suitable for accommodating and supporting a vibration structure.

Optionally, the bracket is further connected to a magnetic circuit system. In the magnetic circuit system, a main magnet 160, an upper pole piece 164 and a sub-magnet 162 are arranged in sequence above a lower pole piece 166 and are supported by the lower pole piece 166. They may be connected by bonding or the like. The magnetic circuit system may further comprise a copper cap (not shown) which is arranged on the upper pole piece 164 and is used for reducing the induced eddy current so as to reduce distortion. The magnetic circuit system in the above embodiment is merely illustrative, and the present disclosure is not limited by the magnetic circuit system, but can be applied to various magnetic circuit systems.

The effective vibration area of a speaker is related to the distance from the highest point of an arc portion of a bend ring to a vertical axis of the speaker. In the above embodiments of the present disclosure, a connection position of a bend ring and a bracket is arranged below an arc portion of the bend ring, so that a connection part of the bend ring does not occupy the width of the speaker, the outer diameter of the speaker is utilized to the maximum extent, and the effective vibration area of the speaker is increased as much as possible, thereby increasing the sensitivity of the speaker as much as possible.

Figure 5:
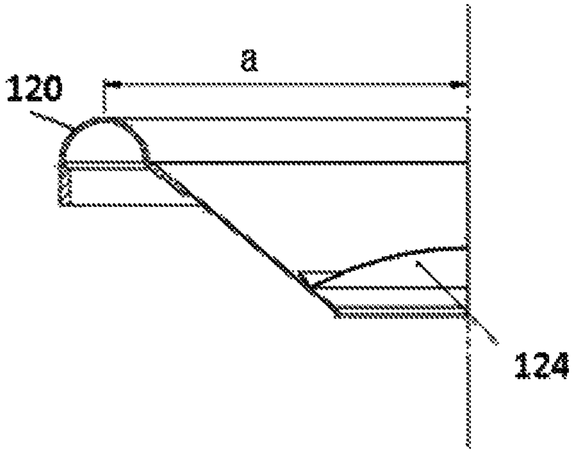
FIG. 5 shows a schematic diagram of an effective vibration radius of a speaker in accordance with the present disclosure.

As shown in FIG. 5, taking a circular bend ring as an example, the effective vibration area S is calculated by using the distance from the highest point of an arc portion of the bend ring to an axis of the speaker as an effective vibration radius a. In the case where the entire width D of the speaker is limited, the distance a from the highest point of the arc portion of the bend ring to the axis of the speaker can be increased as much as possible, thereby maximizing the effective vibration area S.

For other shapes of bend rings, although the effective vibration area is calculated differently, it is related to the distance from the highest point of the bend ring to the vertical axis of the speaker.

In addition to the structure in which the connection position of the bend ring and the bracket is arranged below the arc portion of the bend ring, different shapes of bend rings may also be considered to increase the effective vibration area so as to improve the sensitivity of the speaker.

Figure 4A:
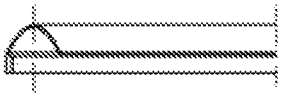
FIGS. 4A-4C are schematic diagrams of different forms of bend rings in accordance with embodiments of the present disclosure.
Figure 4B:
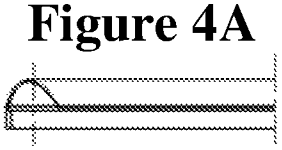
Figure 4C:
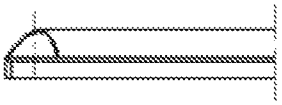
Figure 4D:
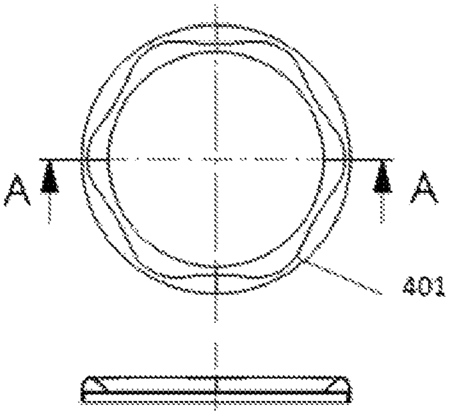
FIG. 4D illustrates a top view and a cross-sectional view, taken along the section A-A, of a waved shape bend ring in the different forms of bend rings as shown in FIGS. 4A-4C.

FIGS. 4A-4C are schematic diagrams of different forms of bend rings in accordance with the embodiments of the present disclosure, and FIG. 4D illustrates a top view and a cross-sectional view, taken along the section A-A, of a waved shape bend ring in the different forms of bend rings as shown in FIGS. 4A-4C.

In FIG. 4A, an arc portion of a bend ring is symmetrical with respect to an axis extending from the highest point of the arc portion along a vertical direction of a speaker. In FIGS. 4B and 4C, an arc portion of a bend ring is asymmetrical with respect to an axis extending from the highest point of the arc portion along a vertical direction of a speaker, and the highest point is offset radially outward (FIG. 4B) or radially inward (FIG. 4C) relative to the midpoint of the width of the arc portion.

The effective vibration area of a circular bend ring formed having the shape shown in FIG. 4B will be greater than the effective vibration area of a circular bend ring formed having the shapes shown in FIGS. 4A and 4C.

FIG. 4D shows a waved shape bend ring formed by using bend rings having shapes shown in FIGS. 4A, 4B and 4C, wherein the highest points of the bend ring form a waved shape (see 401). It can be seen from the cross-sectional view taken along the section A-A of FIG. 4D that the highest point of an arc portion corresponding to a peak part of the waved shape is offset outward, i.e. equivalent to the case shown in FIG. 4B; and the highest point of an arc portion corresponding to a valley part of the waved shape is offset inward, i.e. equivalent to the case shown in FIG. 4C. One of the main functions of the bend ring is to ensure that a diaphragm moves along an axial direction without eccentricity, thereby preventing a voice coil from being rubbed in a magnetic gap. A bend ring formed in this way, relative to a circular bend ring formed to be symmetrical, may better limit the radial movement of the diaphragm, so as to prevent the bend ring from deformation, thereby improving the sensitivity of the speaker. Further, the bend ring is not limited to having the above shapes, and other shapes of bend rings in a symmetrical or asymmetrical form may also be employed. In addition, a reinforcement rib or a pattern may also be arranged on a bend ring to enhance the rigidity of the bend ring and avoid polarization.

Figure 6:
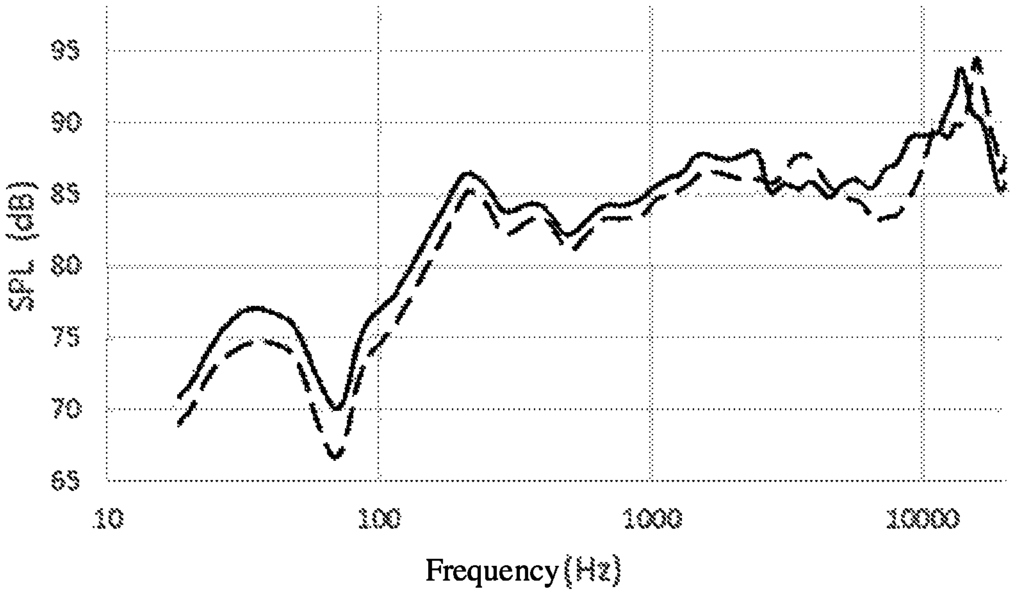
FIG. 6 is a view showing a comparison of sound pressure level curves obtained by using a horizontal connection method and a vertical connection method in the case where the maximum outer diameter of the speaker is the same.

FIG. 6 illustrates sound pressure level curves separately obtained by using a horizontal connection method and a vertical connection method for a bend ring and a bracket in the case where the size of a speaker is 66 mm, wherein a result obtained by the horizontal connection method is indicated by a dotted line, and a result obtained by the vertical connection method is indicated by a solid line. In a horizontal connection method of the bend ring and the bracket, it needs to reserve a certain size on the outer brim of the bend ring for a stable connection with the bracket. However, the size occupied by the connection causes the effective radius of vibration of the bend ring to decrease so as to reduce an effective vibration area, thereby reducing the sensitivity of the speaker unit. It can be seen from the above comparison result that in the case of the same maximum outer diameter, a sound pressure level obtained in the embodiment of the present disclosure is 2-3 dB higher than that obtained in a horizontal connection method. Although the embodiments of the present disclosure are exemplified by an active speaker, the connection for the bend ring and the bracket may also be applied to a device such as a passive radiator. Optionally, a passive radiator and an active speaker may be used together and mounted on a box body of a sound box. The bracket of a passive radiator may be the bracket used in the active speaker in the above embodiments and may also be the box body of the sound box. In addition, the connection method in the present disclosure may be used in a variety of applications where suspension is required.

Although the embodiments of the present disclosure relate to a speaker with an axisymmetric structure, the present disclosure is not limited thereto, but may be applied to other various speakers such as a speaker with a non-axisymmetric structure, such as a racetrack type speaker, a square speaker, etc.

In the above description, illustrative embodiments are employed for the purpose of explaining the principles of the present disclosure and are not intended to limit the scope of the present disclosure. For a person skilled in the art, various modifications and improvements can be made without departing from the spirit and essence of the present disclosure, and such modifications and improvements are also within the scope of the present disclosure.

The invention claimed is:

1. A speaker, comprising:

a support structure having a bracket; and a vibration structure having a bend ring, the bend ring has an arc portion and an outer brim connected to the bracket;

the outer brim of the bend ring extends downwardly to abut and connect to an outer brim of a top of the bracket, the outer brim of the bend ring does not exceed an outermost end of the arc portion in a radial direction, the outer brim of the top of the bracket matches the downwardly extending outer brim of the bend ring and does not exceed the outermost end of the arc portion in a radial direction.

2. The speaker as claimed in claim 1, characterized in that:

the outer brim of the bend ring extends vertically downward, and the outer brim of the top of the bracket has a mating surface therewith.

3. The speaker as claimed in claim 1, characterized in that:

a lower edge of the outer brim of the bend ring does not exceed a lower edge of the outer brim of the top of the bracket, and the bracket comprises a horizontal edge that extends radially outward along the lower edge of the outer brim of the top.

4. The speaker as claimed in claim 1, characterized in that:

the arc portion of the bend ring is symmetrical with respect to an axis extending from a highest point of the arc portion along the vertical direction of the speaker.

5. The speaker as claimed in claim 4, characterized in that:

the highest points of the bend ring form a waved shape in a horizontal direction of the speaker.

6. The speaker as claimed in claim 1, characterized in that:

the arc portion of the bend ring is asymmetrical with respect to an axis extending from a highest point of the arc portion along a vertical direction of the speaker, and the highest point is offset radially outward or radially inward relative to a midpoint of the width of the arc portion.

7. The speaker as claimed in claim 1, characterized in that:

the outer brim of the bend ring is connected to the bracket by bonding or snapping.

8. The speaker as claimed in claim 1, characterized in that:

the vibration structure further comprises a damper, and an outer brim of the damper is connected to the bracket in a vertical direction.

9. The speaker as claimed in claim 1, characterized in that:

the bend ring is made of one or more of rubber, polyurethane and foam.

10. The speaker as claimed in claim 1, characterized in that:

the speaker is a speaker with an axisymmetric structure.

11. The speaker as claimed in claim 1, characterized in that:

the speaker is a racetrack type speaker or a square speaker.

12. The speaker as claimed in claim 1, characterized by further comprising:

a magnetic circuit system having a magnetic gap; and the vibration structure further comprises a damper and a voice coil which can be suspended in the magnetic gap, connected to the damper.

13. The speaker as claimed in claim 1, characterized in that:

the speaker is a passive radiator.

* * * * *